United States Patent [19]

Thijssen

[11] 3,862,347

[45] Jan. 21, 1975

[54] SOLID-LIQUID PACKED BED EXTRACTION

[75] Inventor: Henricus A. Thijssen, North Brabant, Netherlands

[73] Assignee: General Foods Corporation, White Plains, N.Y.

[22] Filed: June 30, 1972

[21] Appl. No.: 267,883

[52] U.S. Cl. ............................. 426/434, 23/267 B
[51] Int. Cl. ........................ A23f 1/08, B01d 11/02
[58] Field of Search ..... 99/65, 71; 23/267 C, 270.5, 23/310, 270 R, 309–311, 267 A–267 F; 426/432, 434, 425–432

[56] References Cited
UNITED STATES PATENTS

| | | | |
|---|---|---|---|
| 2,236,059 | 3/1941 | Henser............................ | 23/272 X |
| 2,515,730 | 7/1950 | Ornfelt........................... | 99/71 |
| 2,587,556 | 2/1952 | Weiss et al...................... | 99/71 UX |
| 2,713,009 | 7/1955 | Bruniche-Olsen .............. | 23/310 X |
| 2,915,399 | 12/1959 | Guggenheim et al........... | 99/71 |
| 3,148,069 | 9/1964 | Sjogren et al................... | 99/71 |
| 3,369,874 | 2/1968 | Wilhelm.......................... | 23/267 C |
| 3,655,398 | 4/1972 | Pitchon et al................... | 99/71 |
| 3,720,518 | 3/1973 | Galdo et al. .................... | 99/71 |

OTHER PUBLICATIONS

Sivetz et al., Coffee Processing Technology, Vol. I, 1963, pp. 345, 346.

Primary Examiner—Frank W. Lutter
Assistant Examiner—Neil F. Greenblum
Attorney, Agent, or Firm—Howard J. Newby; Bruno P. Struzzi; Daniel J. Donovan

[57] ABSTRACT

Channeling of solvent in a compacted (packed) bed of solid particles during extraction of soluble material from the particles can be minimized or substantially eliminated by operating the system such that the viscosity of the extracting fluid (solvent) within the interstices formed between solid particles at every point in the porous packed bed progressively decreases in the direction of increasing concentration of soluble material in the solvent. Temperature control is one method of effecting the proper viscosity profile of the extracting fluid throughout the packed bed during the extraction process. The method, with respect to the extraction of soluble solids from roast and ground coffee provides an effective means for obtaining a high concentration of coffee solids in the effluent extract and at a high yield and relatively short residence time thus avoiding the need for further concentrating the extract prior to dehydration in the production of soluble coffee powder.

8 Claims, 6 Drawing Figures

PATENTED JAN 21 1975 3,862,347

SOLID-LIQUID PACKED BED EXTRACTION

BACKGROUND OF THE INVENTION

1. Field of the Invention

This invention relates, in general, to the solvent extraction of soluble constituents from solid particles. In particular, the invention pertains to the extraction (leaching) of soluble components from sub-divided vegetable and/or animal material by the percolation of a solvent through a porous packed bed of the sub-divided particles and, more specifically, the invention is concerned with the water extraction of roasted coffee soluble solids.

2. Description of the Prior Art

Methods and apparatus for the extraction of soluble components with a suitable solvent from solid particles in packed bed aggregation have been extensively described in the chemical engineering literature. Although a wide variety of techniques and apparatus have been used, packed bed solid-liquid extraction may be broadly classified as batch, countercurrent, and multistage batch-countercurrent extraction. Among the well known means for countercurrent extraction is the Bollman extractor. The Shanks extraction system is representative of the multistage batch-countercurrent extraction method.

In a batch process, a vessel is charged with the solid particles from which the soluble components are to be extracted and solvent is introduced either at the top or bottom of the stationary packed bed of solid particles and caused to pass through the bed. In the batch, one vessel, method of extraction, the most concentrated solution that can usually be made is relatively dilute.

If it is necessary to prepare a more concentrated solution, a countercurrent operation is used. In this case, in a single vessel, the solid particles, in the form of a packed bed, are caused to continuously pass in one direction through the vessel and solvent is urged through the packed bed in the opposite direction.

Alternatively, a multistage batch-countercurrent method can be employed either in a series of tanks (percolators), as shown and described in U.S. Pat. No. 3,655,398, containing solids in various stages of extraction. Fresh solvent is introduced into the tank containing the solids which are most nearly extracted, flows through the several tanks in series, and is finally withdrawn from the tank that has been freshly charged with solids. The solid, non-soluble, material in any one tank is stationary until it is completely extracted. By means of suitable piping connections, so arranged that fresh solvent can be fed to any tank and strong solution drawn off from any tank, it is possible to charge and discharge one tank at a time. Countercurrent operation takes place by flowing the extracting liquid continuously through the battery of extractors in one direction while the positions of the individual extractors relative to the flow of extracting liquid are progressively advanced in the opposite direction.

The present invention pertains to the above methods and apparatus of solid-liquid extraction and is directed toward the complete extraction of the soluble constituents from the solid particles with a minimum of solvent per unit weight of material to be extracted and in the minimum possible time. Reduction in the amount of solvent results in a reduction in the cost of separating it from the extracted material and, reduction in the length of time for which the solids subjected to extraction remain in the extraction installation allows a reduction in the size of the installation, with a consequent reduction in its cost. Additionally, and most importantly, a reduction in extraction time reduces flavor and aroma degradation reactions.

In contrast to the "disperse contact" type of solid-liquid extraction in which the solid particles are suspended in the solvent and are in motion relative to each other and to the solvent during the time of contact, the above described methods are classified as "solid bed" or "packed bed" solid liquid extraction methods. For the purpose of this invention, the term "packed bed" refers to an operation in which the solid particles are kept in relatively fixed position with respect to each other while the solvent flows through the porous bed of solid particles, whether or not the bed of solid particles remains stationary with respect to the containing vessel during the extraction.

Packed bed-type solid-liquid extraction has certain advantages over the dispersed contact operation. For example, the solid particles, fixed in position relative to each other, act as a filtration medium and retain much of the insoluble fine material which would otherwise be included in the effluent solvent. This filtration effect is particularly noticeable in the case of extracting soluble solids from roast and ground coffee.

In packed, porous bed solid-liquid extraction, the efficacy of the filtration effect and the efficiency of the extraction of the soluble constituents is enhanced, to a point, with a reduction in the mean size of the solid particles to be extracted. That is, for any given ratio of solvent input to solid material input, the extraction time required for a desired degree of extraction decreases, to a minimum, with a corresponding decrease in the mean particle size of the solid material. However, the solvent pressure differential through the packed bed increases sharply as the mean particle size of the solid material decreases and there is a given minimum size below which the resistance to liquid flow becomes excessive and precludes an adequate rate of extraction at the maximum ermissible pressure for the installation. Since permissible particles of vegetable or animal origin are, in general, compressible, any increase in the pressure differential above a critical level ceases to produce an increase in the flow of solvent through the bed.

It is also well-known that non-uniform flow (maldistribution) of the solvent through the bed of solid particles, otherwise called channeling, decreases the efficiency of the extraction operation. An uneven or preferential flow of solvent causes the areas of the packed bed outside of the preferential flow to be extracted to a lesser extent or not at all. Therefore, preferential flow, or channeling causes the extraction time to be extended and the amount of extraction fluid (solvent) for a given weight of material processed to be increased.

Channeling of the solvent through the packed bed can result, of course, from non-uniform packing of the bed; but even when great care is taken to prepare uniformly packed beds of solid particles, channeling is experienced. Channeling is a major deterrent to efficient packed bed extraction operations and the prior art is replete with theories and possible methods for overcoming or avoiding the problem. Although data indicate that the extent of channeling is influenced by such factors as column "wall effect" and that the magnitude of channeling generally increases with an increase in concentration of solute in the solvent, an increase in pressure differential through the packed bed and a decrease in solid particle size, the problem has remained incompletely resolved.

Accordingly, prior to the instant invention, an unfilled need existed for a method which would substantially eliminate channeling and ensure uniform flow of solvent through a packed bed of material from which soluble constituents are to be solvent extracted.

A novel method of solid-liquid extraction has now been discovered which is adapted to alleviate to a significant degree the above discussed drawbacks of channeling while retaining the advantages of a conventional packed bed-type operation.

SUMMARY OF THE INVENTION

The process, according to the present invention, enables a method of packed bed solid-liquid extraction in which channeling in the packed bed of solid particles is substantially completely eliminated. The process is equally effective for those operations in which the solid particles are stationary and for those operations in which the particles remain in fixed spatial relationship to each other but wherein the total bed of particles moves, either upwardly or downwardly, in relation to the vessel in which they are contained. As such, high concentrations of solute in the effluent solvent can be achieved with a minimum of residence time of solid particles and solvent in the installations.

The gist of the invention resides in the discovery that channeling of solvent through a packed bed (or a series of packed beds) of solid particles can be almost completely eliminated, provided the bed(s) is substantially uniformly packed, by maintaining the viscosity profile of the solvent such that the viscosity of the solvent at every point in the bed (or, in the case of multistage batch countercurrent operation — in the beds) decreases with an increase in the concentration of solute in the solvent. That is, in a single pass (or multipasses of solvent through a single bed) or, as in multistage batch-countercurrent operation, through a series of beds, each following incremental portion of solvent flowing through the bed at a fixed plane in the bed has a higher viscosity than the immediate preceding increment. Thus, the process of the invention entails strict control of the viscosity profile of the solvent as it advances through the packed bed or beds of particles and as it increases in concentration of solutes. In most instances, the incremental decrease in viscosity can be very small and, in fact, can be almost negligible. The important point, however, and the nub of the invention is the discovery that the viscosity of the solvent should not increase (and, preferably, should decrease) with an increase in concentration of soluble solids.

In effect, the interstices of the packed bed are admitting succeeding quantities of solvent with higher viscosity as the solubles are being extracted from the solids, and, in theory, the solvent having a higher viscosity than that preceding it through the packed bed travels through the previously established uniformly distributed interstices rather than through a few preferential channels.

In the method of the invention, therefore, as the solid phase is depleted of soluble constituents, although it is subsequently contacted with solvent having lower concentration of soluble materials, the succeeding solvent has a higher viscosity. The higher viscosity of the succeeding solvent makes it more effective in displacing the previous increment of solvent.

Thus, if temperature is employed to control the viscosity of the solvent, it can be appreciated that an efficient washing (displacement) at a lower temperature follows a higher temperature solubilization operation with a minimum amount of solvent. This is particularly important from a flavor standpoint in the case of solvent extraction of soluble components from roast and ground coffee particles.

The foregoing has been presented by way of an explanation of the phenomenon of solid-liquid extraction as carried out by the method of the instant invention. Such explanation is only intended as a theory as to what is believed to occur, and the invention is not to be limited thereto.

DESCRIPTION OF THE PREFERRED EMBODIMENTS

Although the principle of the invention disclosed herein for maximizing extraction efficiency and for minimizing channeling in solid or packed beds during a solid-liquid extraction operation is applicable to the extraction of solubles from many sources and with various solvents, the preferred embodiments will be described in terms of extracting the water soluble constituents from particles of roast and ground coffee.

The terms "extract" and "extracting liquid" as used herein are to be understood to be synonymous with the term "solvent." With respect to soluble coffee manufacture, "extract" is water containing soluble coffee solids and is used as the solvent to solubilize additional soluble solids. Extract is also the term applied to the resulting liquid product obtained from the extraction operation.

In order to manufacture soluble coffee powder or solid particles which has desirable flavor and physical characteristics, it has been found advantageous to spray dry a coffee extract which has a soluble solids concentration significantly higher than that which can be achieved in standard solid-liquid extraction operations. Also, it has been found economically advantageous in processes for manufacturing freeze dried soluble coffee to utilize higher concentrations of soluble solids in the extract to be freeze-dried. It is common practice in processes where extracts of higher concentrations than those obtained in standard extraction operations are needed, to concentrate the extract by vacuum evaporation or freeze concentration. These concentration techniques have major disadvantages. Vacuum evaporation tends to strip off desired aromatic constituents which must be then added back to the concentrated extract in an attempt to achieve a high quality concentration extract. Freeze concentrations, while producing a more flavorful concentrated extract, is more expensive than evaporative concentration techniques. Also, all of the techniques used to concentrate the extract obtained from a standard extraction operation add to the cost and complexity of manufacturing a quality soluble coffee. Therefore, the advantages of an extraction process producing coffee extract of high soluble solids concentration can be readily appreciated.

In the conventional multistage batch-countercurrent system for the extraction of soluble solids from roast and ground coffee with hot water, it has been determined that, due to the marked channeling in the series of beds of packed coffee particles, a reduction in the amount of solvent per unit weight of charged coffee particles, given a constant duration of retention, does not appreciably increase the solute concentration of the effluent solvent. Also, channeling appears to occur more markedly as the mean particle size of the coffee particles for extraction becomes smaller. As a result of these factors on the size of the apparatus for a required productivity, an average extract concentration of above 25 percent of soluble solids by weight of the extract is generally not exceeded and the mean particle size of the roast and ground coffee to be extracted generally is between 0.5 – 3.0 millimeters (mm) (35 – 6 U.S. Standard Mesh). Usually, before drying the effluent extract, it is necessary to raise the concentration of soluble solids, such as by freeze-concentration or evaporation of the extract, to about 35 – 50 percent by weight of the extract. Understandably, it is readily appreciated that extraction in equipment of about the same size, which delivers an extract of about 35 percent – 50 percent by weight of soluble solids without requiring concentration, would be considerably cheaper.

The process according to the present invention enables a method of solid liquid extraction (leaching) of roast and ground coffee in which channeling in the packed bed of coffee particles is almost completely eliminated and this results in a high concentration of solubles in the range of 35 – 50 percent by weight of the extract. This high concentration can be obtained in the effluent extract with the time of residence in the installation approximately equal to that which previously produced an extract containing 25 percent soluble solids and with the same yield.

During the extraction of water solubles from roast and ground coffee, as with the extraction of soluble solids from other vegetable and animal material with water or other solvents, an increase in the concentration of solute in the solvent produces, at constant temperature, an increase in the viscosity of the solvent. One method of preventing the viscosity of the solvent from increasing with an increase in solute concentration is that of raising the temperature of the solvent as it extracts succeedingly increasing amount of solute. Accordingly, the mean temperature gradient required to maintain uniform flow (no channeling) through the packed bed is determined, on the one hand, by the concentration gradient of the extract in the bed in the direction of the extract flow, and on the other, by the effect of temperature and concentration on the viscosity of the extract (solvent). The temperature variation through the entire packed bed must, therefore, be such that the viscosity of the solvent at the point where it is introduced to the bed of roast and ground coffee must be greater than at the opposite end of the packed bed where the concentration of solute in the solvent is maximal.

For a single packed bed of coffee, therefore, or for each of a series of packed beds of coffee in a batch multistage-countercurrent system wherein the coffee is stationary in the vessel, the temperature gradient of the extract throughout the bed can be achieved by heating the bed, while in place, such that the viscosity of the solvent decreases, or at least remains constant, as it travels through the stationary bed of material which is being extracted of soluble constituents. Heating of the column and of the material therein can be effected in a number of ways, including electrical conduction.

Figures 1, 1A:
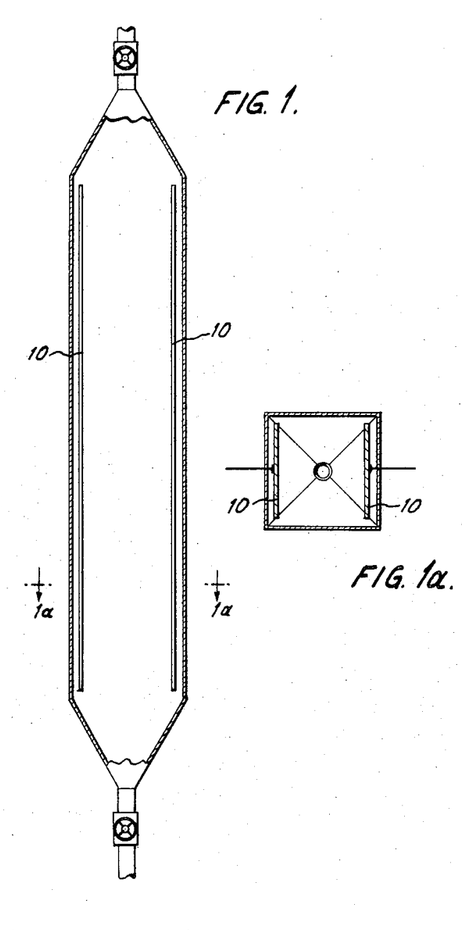
FIG. 1 is an elevational view partly in section, of an extraction column.
FIG. 1a is a horizontal sectional view of the extraction column taken along line 1a of FIG. 1.

FIG. 1 illustrates one method of heating such an extraction column. A set of opposed electrodes 10, each electrode extending in length substantially equal to the packed height of a rectangular (in cross section) column. A suitably adjustable electromotive force is applied across the electrodes to produce an alternating electrical current through the bed in a direction normal to the flow of the extracting fluid. The electrical resistance of the material in the column effects a positive temperature gradient in the direction of the extracting fluid flow.

Assuming the extraction column to contain a charge of freshly roasted and ground coffee and the extracting fluid, as effluent extract from a previous column in series, to have a soluble solids content of approximately 20 percent at the point of introduction proximate the base of the column and a temperature of about 20°C (the viscosity of the extract at these conditions is about 4 centipoise), the electrical current passing through the bed of packed coffee and the extracting fluid will cause the temperature of the extracting fluid to increase as it flows upwardly through the porous packed bed. Thus, there will be produced an increase in temperature (and a decrease in viscosity) of the extracting fluid as it increases in soluble solids content.

By suitable regulation of the magnitude of the electrical current and that of the extracting fluid flow rate, the extract will initially exit from the top of the column at a temperature of about 110°C with a soluble solids concentration of about 50 percent and a viscosity of approximately 2 centipoise (cp). As the extraction operation continues, the concentration of soluble solids in the effluent extract will decrease until, at the termination of draw-off, the effluent extract will have a concentration of about 30 percent soluble solids and a viscosity (at 110°C) of about 0.4 cp. Therefore, throughout the course of the extraction operation, the effluent extract will always have the desired lower viscosity than that of the entering extracting fluid.

Those skilled in the art will appreciate that by the system described and illustrated in FIG. 1 the temperature of the extract can be readily controlled at all points in the columns by means of the electrical heating installation such that the viscosity of the extracting fluid will decrease with a corresponding increase in soluble solids content.

A similar set of operating conditions and column temperatures would exist when the extract is introduced at the top of the column and passed downwardly through the stationary packed bed of coffee. In this situation, however, the temperature (and viscosity) profile would be reversed with the column and contents heated to about 110°C proximate the bottom of the column and a temperature of about 20°C maintained near the top.

Figure 2:
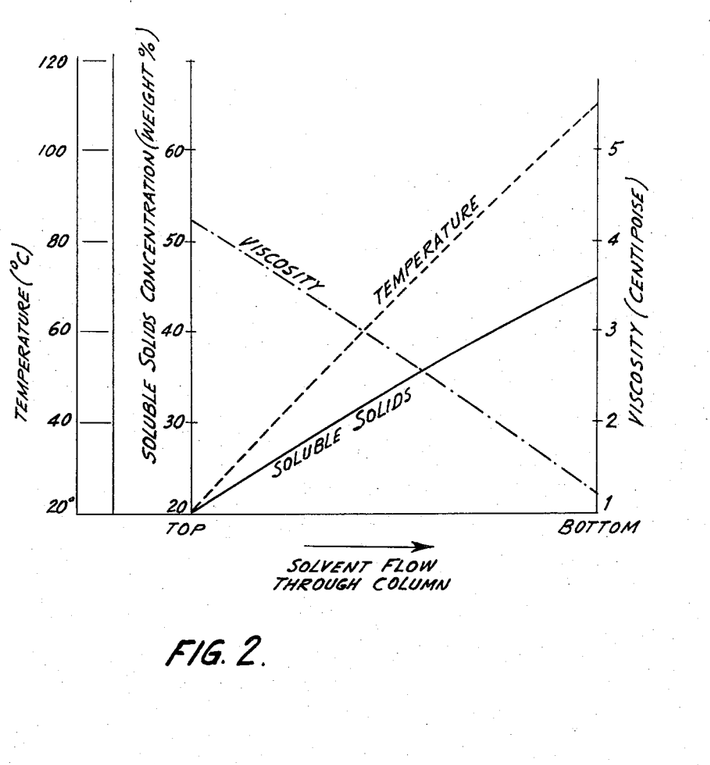
FIG. 2 is a graph showing the relationship among temperature, viscosity and soluble solids content of the solvent as it passes through the extraction column in accordance with the method of the invention.

In the practice of the invention, typical ideal relationships among extract viscosity, soluble solids concentration in the extract and extract temperature as the extract progresses through a moving packed bed of fresh roast and ground coffee are shown schematically in FIG. 2.

The data shown are for a uniformly packed bed of fresh roast and ground coffee particles progressing upwardly through a column and being countercurrently extracted of soluble components with an extract containing 20 percent soluble solids (effluent from a previous column in a multistage batch-countercurrent installation) entering at the top of the column and progressing downwardly through the packed bed of moving coffee solids. As the extract proceeds downwardly through the packed bed, it solubilizes coffee solids and increases in soluble solids content. Ordinarily the increase in soluble solids content would cause a corresponding increase in viscosity of the extract; however, by uniformly increasing the temperature of the extract during its passage through the porous bed (to be described hereinafter), the viscosity of the extract is decreased as it approaches the bottom of the column whereat it has the highest concentration.

For a single packed column solid-liquid extraction system in true countercurrent operation i.e., solid particles continuously being introduced into one end of the column and solvent continuously being introduced into the opposite end, the decrease in the viscosity of the solvent with an increase in concentration of solute can be achieved by adding the solid particles to be extracted to the packed bed at a higher temperature than that of the solvent. The difference in temperature through the packed bed must be sufficient to cause the desired reduction in viscosity of the solvent as it percolates through the moving bed of particles. A virtual linear increase in temperature through the bed in the direction of solvent flow can be obtained by maintaining the ratio of solvent input to the solid particles input such that the product of net mass flow rate and specific heat of the solvent in the bed is about equal (or slightly higher) to the product of the net mass flow rate and specific heat of the wet solid particles in the bed.

Figure 3:
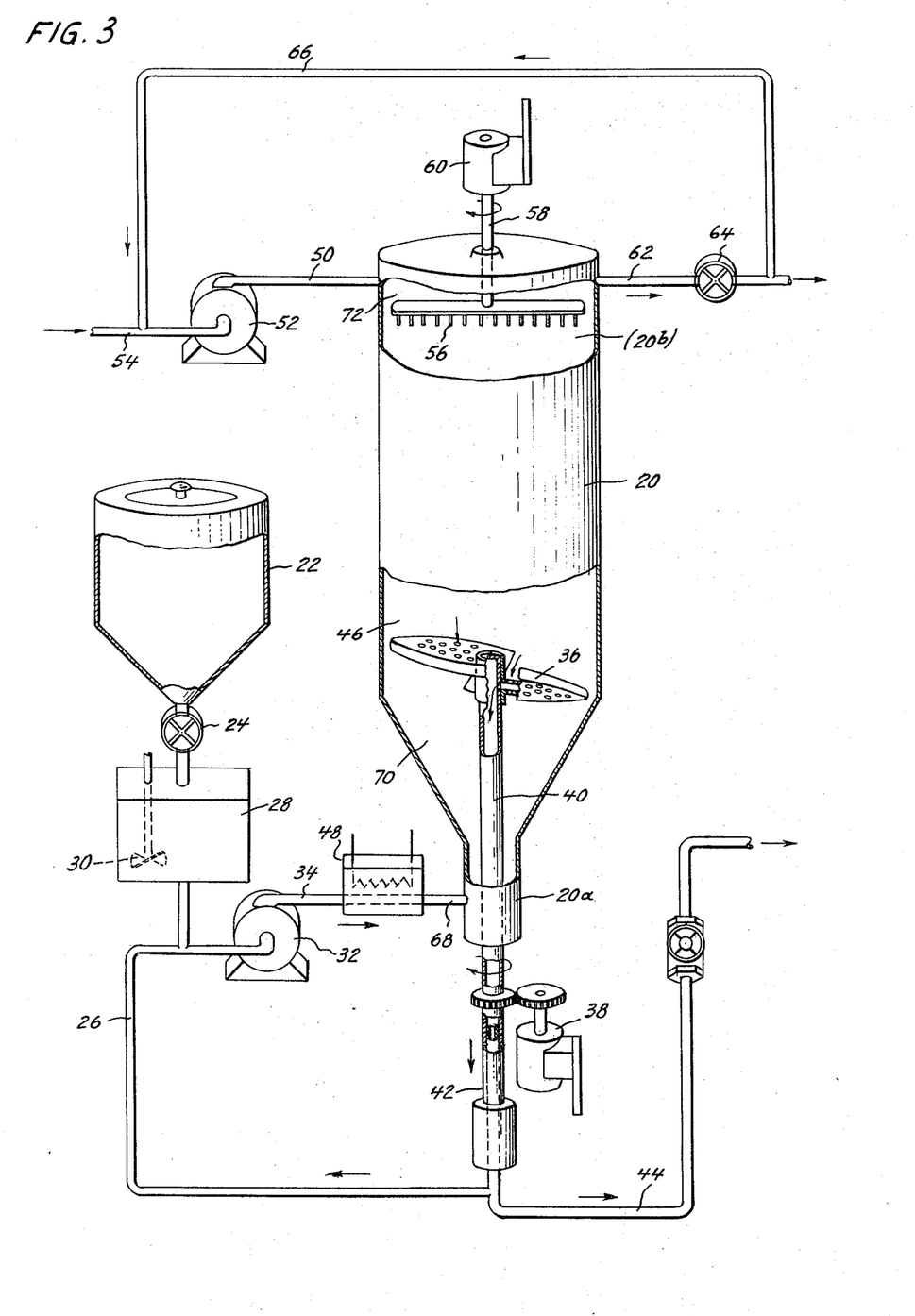
FIG. 3 is a schematic view of a single column continuous solid-liquid extraction process and equipment of the invention.

For the single, packed column, true countercurrent method of extraction, an installation as shown in FIG. 3 can be employed. The installation, consists of a cylindrical vessel with means for feeding the solids particles to be extracted in the form of a suspension at one end (the lower end of the column) and means for introducing the solvent at the upper end of the column.

As illustrated, a rotating rake-type scraper unit is installed within the column in proximity of the upper end for raking the upper surface of the upwardly moving bed of particles and causing them to be suspended as a slurry for discharge from the column.

A hollow screw-type feeder mechanism located near the base of the column functions to compact the fresh coffee particles as they enter the column near the base as a suspension in the extract and urges the compacted bed of coffee particles upwardly through the column countercurrently to the downward flow of extract. By suitable orientation, location, and size of apertures in the upper surfaces of the hollow blades of the screw feeder, effluent extract is separated from the packed bed and discharged through the hollow drive shaft. A similar arrangement of apertures in the lower surfaces of the screw feeder provides means for separating the liquid released as the feeder compresses the entering suspension of coffee particles into a compacted bed.

Referring to FIG. 3 the extraction assembly consists of an extraction column 20 in which countercurrent extraction of coffee particles compressed into a porous packed bed is performed. A hopper 22 is provided for the supply of fresh roast and ground coffee which is discharged through the star valve 24 and incorporated with the recycling extract of high soluble solids content introduced through conduit 26 from a vessel 28 equipped with an agitator 30. By means of pump 32 the coffee particles, suspended in the extract, are introduced into the column near its base 20a through conduit 68. The screw feeder mechanism 36, rotated by the drive 38 through the hollow shaft 40, urges the suspension of fresh coffee in the extract upwardly and, as the coffee solids are separated from the liquid by the action of the perforated hollow screw feeder they are compacted into a porous bed and urged upwardly through the column. The separated liquid (extract) enters the perforations in the lower face of the hollow screw blade and flows through the hollow drive shaft 40 and is discharged through conduit 42. A portion of the extract having a high concentration of dissolved solids is drawn off as product through conduit 44 and a sufficient amount of the extract is recirculated through conduit 26 and through the heat exchanger 48 to repeat the cycle.

As the packed bed of coffee particles moves upwardly through the column, the coffee particles are extracted of soluble solids by contact with the downwardly flowing extract which has been admitted to the column in proximity of the top by means of conduit 50, pump 52 and conduit 54. As the coffee particles in the packed bed approach the upper end, they are scraped or raked from the top of the bed by the rotary action of the rake mechanism 56, driven by the shaft 58 and drive 60. A significant portion of the solvent (water or extract from a previous extraction) admitted to the column is employed to suspend the spent grounds and discharge them from the column through conduit 62 and valve 64. The spent grounds are then separated from the extract by any of a number of standard separation techniques (not shown) and the liquid can be recycled via the conduit 66.

For the prupose of facilitating an understanding of the method of the invention and not limiting the invention thereto, the following operative data are presented for the extraction of coffee soluble solids from fresh roast and ground coffee as conducted in the apparatus as illustrated in FIG. 3. The data are representative for extraction conditions wherein the column is continuously charged with fresh coffee which is to be partially extracted of soluble solids with extract containing 20 percent by weight soluble coffee solids. That is, the data presented below are those which are obtained when the extraction column is one in a series of two or more. The data correspond to that shown in FIG. 2.

A column as shown in FIG. 3 having an internal diameter of 26.5 centimeters (cm) and a packed bed length of 200 cm is charged continuously with fresh roast and ground coffee at a uniform rate of 100 kilograms (kg) per hour. The mean particle size of the coffee particles is 1 mm and the residence time of the coffee particles in the column in packed bed aggregation is 30 minutes. The coffee is measured continuously through the delivery valve 24 and coffee extract with a soluble solids content of 40 percent by weight of the extract flows at a rate of 900 kg per hour through the outflow conduit 42. Of this, 100 kg per hour leaves the apparatus through the outflow conduit 44 as product and 800 kg per hour is recirculated by the pump 32 via the conduit 34 heat exchanger 48 and then via conduit 68. The fresh roasted coffee particles entering the input tube 26 from the tank 28 are suspended in the extracting fluid and conveyed hydraulically to the suspension chamber 70. The temperature of the suspension of fresh coffee in extract entering the column is maintained at 110°C by the heat exchanger 48.

In the extraction column 20 the coffee suspension is compressed by the screw blade 36 into a solid bed 46. The liquid released during compression is conducted through the perforated surface of the blade oriented away from packed bed, via the hollow shaft and the outflow tube 42. The screw is driven by the motor 38.

At the upper section 20b of the extraction column, the coffee granules from the packed bed 46 are removed by the rotating scraper 56 and brought into suspension in the suspension chamber 72. The liquid required for this suspension is introduced into the column at 20°C by the pump 52 via the conduit 50. The soluble solids concentration of this liquid is 20 percent by weight upon entering the column. The suspension is carried off by the conduit 62 through the valve 64. The pressure of the suspension in the chamber 72 is maintained at about 10 kg per cm² and that of the extracting fluid in the extract outflow tube 42 is approximately 5 kg per cm². As a result of this decrease in pressure, the extraction fluid flows countercurrently through the coffee particles toward the screw 36 where it is carried off via the perforated surface of the blade facing the packed bed, and thence, via the hollow shaft 40. The coffee particles in the bed are pushed upwardly by the screw toward the rotating scraper 56. The temperature of the bed falls in approximately linear fashion from 110°C at the screw to 20°C at the scraper. The viscosity of the extract at the screw is about 1.5 centipoise (cp), with 40 percent by weight soluble solids content; the viscosity of the cool extract at the scraper is about 4 cp with 20 percent dissolved solids. Owing to the absence of channeling, more than 95 percent of the material extractable at 110°C is removed from the coffee particles by the method described above.

Figure 4:
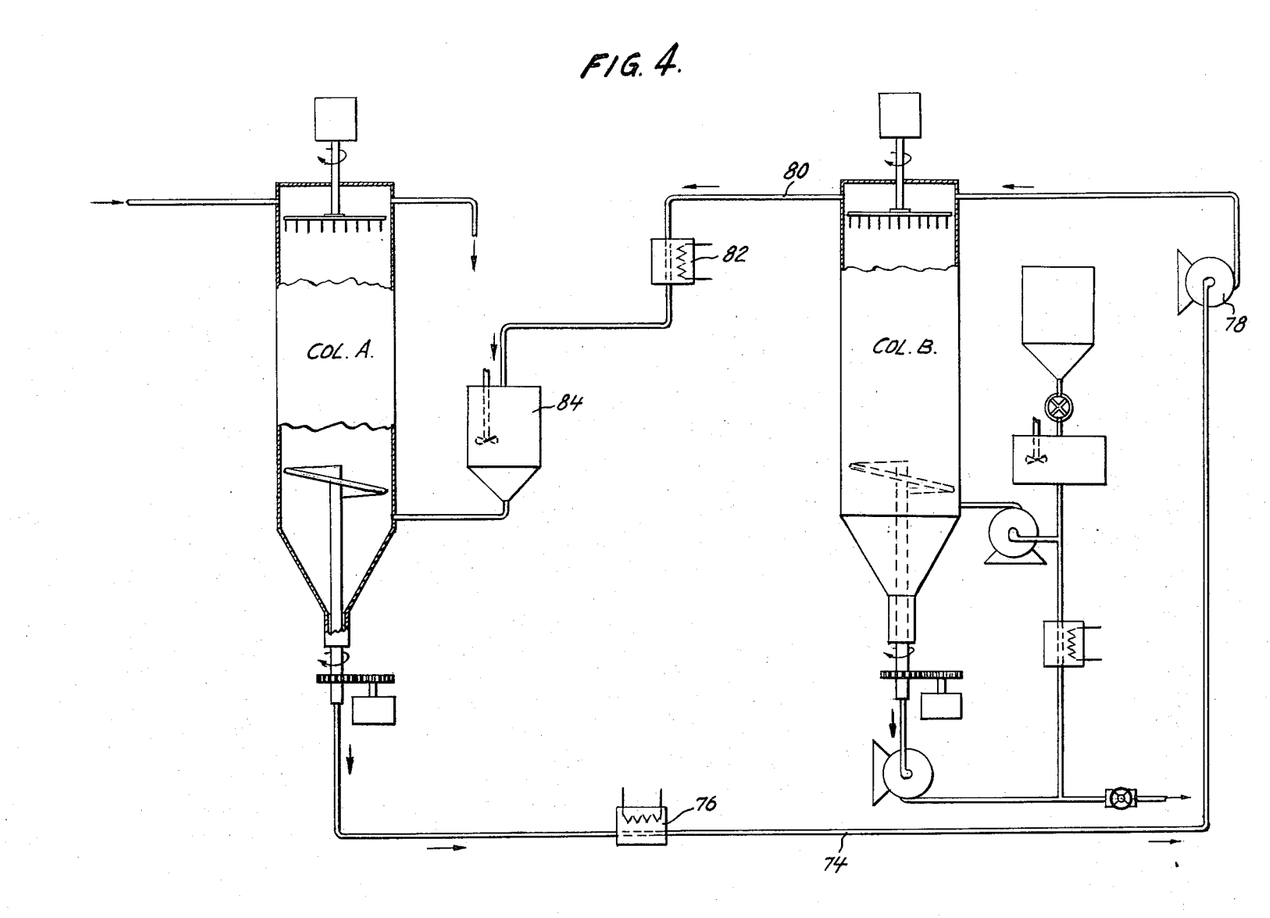
FIG. 4 is a schematic view of a two column continuous solid-liquid extraction process and equipment of the invention.

For the complete extraction of soluble solids from roast and ground coffee by the method of the invention, a two-stage extraction assembly as shown in FIG. 4 can be employed. As shown, two extraction columns, each as shown in FIG. 3 and described hereinabove are connected in series and employed as a unitized extraction system.

As illustrated in the schematic diagram (FIG. 4), the extraction columns are connected to each other by means of conduit 74 in which the effluent extract containing the soluble solids extracted from the coffee particles in Column A is cooled in the heat exchanger 76 and then transferred to the top of Column B by means of the pump 78.

In true countercurrent fashion, the partially spent coffee grounds discharged from Column B are transferred as a slurry to the base of Column A via the conduit 80. Prior to entering Column A the partially spent coffee grounds are heated in the heat exchanger 82 and held in the holding tank 84 at a high temperature for hydrolyzing the coffee components.

In order to obtain a more complete understanding of the invention, a representative method of practicing the invention with the extraction assembly as shown in FIG. 4 will now be presented. It should be understood, however, that the following data are also meant to be illustrative and the invention is not to be limited thereto.

Each of the extraction columns (or percolators) as shown in FIG. 4 has an internal diameter of 26.5 cm and a packed bed length (height) of 200 cm. Column B is charged continuously with fresh roast and ground coffee at a uniform rate of 100 kg per hour and the extraction conditions and parameters for Column B are the same as those described in the previous discussion.

the partially spent coffee grounds are discharged from the top of Column B in the form of a slurry at a rate of 312.5 kg per hour. The slurry is made up of about 61 percent water and 39 percent coffee solids. As such, Column A is charged continuously with a slurry made of about 122.5 kg/hr. of coffee solids of which about 47 kg/hr. are soluble solids. The slurry exits from Column B at 20°C and is heated to 180°C and held in the holding tank before entering the base of Column A. The heating coffee particles are urged upwardly in Column A and are contacted in a true countercurrent manner with extract percolating downwardly through the packed bed. Fresh solvent (water) is introduced near the top of Column A at a rate of 210 kg/hr. Approximately 150 kg/hr. of the water is employed to slurry and discharge 60 kg/hr. of spent (waste) grounds (on a dry basis) from Column A and 60 kg/hr. of water is employed to extract the remaining soluble solids from the coffee particles in Column A. The water enters Column A at a temperature of 20°C and has a viscosity of about 1 cp. As the water percolates downwardly it increases in soluble solids concentration until it exits as extract with a soluble solids content of 20 percent. However, because the extract is uniformly heated by the hot coffee particles as it progressively increases in concentration, its viscosity uniformly decreases until, at the point of highest soluble solids concentration (20 percent) and a temperature of 180°C it has a viscosity of about 0.4 cp.

Therefore, in both Columns A and B extraction conditions are in accord with the fundamental concept of the invention — a decrease in the viscosity of the extracting liquid (solvent) as the soluble solids concentration of the extracting liquid increases; and the example illustrates how a high soluble solids content of 40 percent can be obtained in the effluent extract with an overall yield of 40 percent soluble solids based on the weight of the roast and ground coffee.

Those skilled in the art of soluble coffee manufacture will readily appreciate how the inventive concept and apparatus described above can be incorporated in a standard soluble coffee percolation (extraction) operation to increase the soluble solids content of the effluent extract from an average of about 20 – 30 percent to about 40 – 50 percent with a yield of soluble solids of about 40 – 50 percent, based on the weight of the roast and ground coffee.

Figure 5:
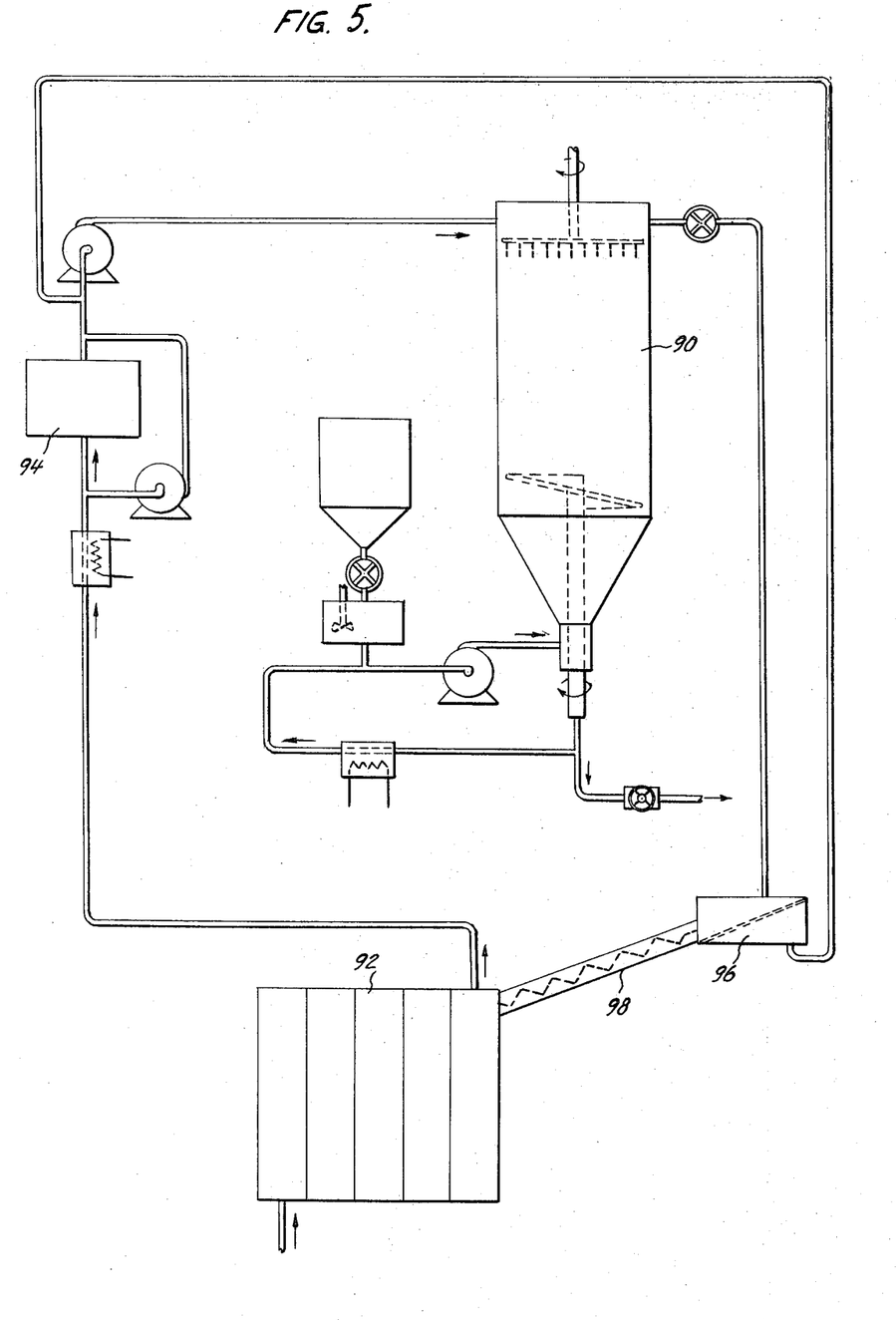
FIG. 5 is a schematic view of a preferred solid-liquid extraction process and equipment wherein a countercurrent extraction column is employed in conjunction with a train of multi-stage batch-counterrent extraction columns.

FIG. 5 is a schematic drawing depicting a preferred arrangement wherein the countercurrent column 90 is employed as the extraction column for fresh roast and ground coffee to be extracted with dilute extract from a train of five multistage batch-countercurrent percolators 92. Since each of the five percolators are operated on a batch basis and are charged and discharged with coffee particles periodically, the additional equipment required consists of a surge tank 94 for holding the dilute effluent extract from the multistage batch-countercurrent percolators, a separator 96 for separating the partially spent grounds from extract, and a conveyor 98 for charging the partially spent grounds from the countercurrent column to the appropriate percolator in the multistage batch-countercurrent section of the system. As indicated in FIG. 5, the surge tank 94 is employed to accommodate the periodic rapid draw-off of extract from the batch percolator which is then introduced at a slower, uniform rate to be enriched with soluble coffee solids in the continuous column. Each one of the percolators in the train of five, in turn, is charged at a uniform rate with the partially spent grounds from the continuous column in order to maintain an operative balance of transfer of material in the system.

The invention has been described in terms of a decrease in viscosity of the extraction liquid as it progresses downwardly through either a stationary packed bed of particles or an upwardly moving bed. However, it is within the scope of the invention to include those extraction methods and operations wherein, with suitable apparatus, the extracting fluid is urged through the packed bed (either stationary or moving) in an upward direction.

The scope of the invention also encompasses methods, other than temperature alone, to control the viscosity of the extracting fluid. Solvent additives, such as gums or other materials to effect a greater change in solvent viscosity with smaller changes in temperature is indicative of the various modes contemplated of carrying out the invention.

In summary, the salient point of the invention is the discovery that channeling of the solvent in a packed bedtype extraction operation can be significantly reduced when extraction conditions are maintained such that the viscosity of the extracting fluid decreases as the soluble solids content increases and, by the foregoing, the gist of the invention has been so fully revealed that others can be applying current knowledge readily adapt it for various application without omitting features that, from the standpoint of the prior art, fairly constitute essential characteristics of the generic and specific aspects of the invention.

What is claimed and desired to be secured by Letters Patent is:

1. In a multi-stage batch-countercurrent method of solvent extraction of soluble constituents from solid particles compacted into stationary porous packed beds, the improvement which comprises, extracting a portion of the soluble constituents from the freshly charged solid particles in the last stage of the multistage system at operating conditions which cause a temperature gradient increasing in the direction of flow of the extracting fluid to cause the extracting fluid, containing solutes extracted from solid particles in prior stages, to decrease in viscosity as said extracting fluid passes through the freshly charged stationary porous packed bed of solid particles and solubilizes a portion of the soluble constituents therein.

2. The method of claim 1 wherein the passage of the extracting fluid is downward through the freshly charged stationary porous packed bed of solid particles.

3. The method of claim 1 wherein the passage of the extracting fluid is upward through the freshly charged stationary porous packed bed of solid particles.

4. The method of claim 1 wherein the solid particles are particles of roast and ground coffee.

5. The method of claim 4 wherein the solid particles of roast and ground coffee have a mean particle size of about 1 millimeter.

6. In a continuous countercurrent method of solvent extraction of soluble constituents from freshly charged solid particles compressed into a porous bed, said bed moving countercurrent to the flow of solute-containing solvent through it, the improvement which comprises, establishing a temperature gradient throughout the depth of the packed bed by supplying solute-extractable solid particles continuously to the bed at a higher temperature than that of the solute-containing solvent such that the temperature of the solvent entering the porous bed is less than the temperature of the solute enriched solvent leaving the porous bed, whereby the viscosity of the solute-containing solvent within the interstices of the porous bed of solid particles decreases in the direction of increasing concentration of the solute in the solvent.

7. The method of claim 6 wherein the passage of the solute-containing solvent is downward through the upward moving bed of solid particles.

8. The method of claim 6 wherein the solid particles are particles of roast and ground coffee having a mean particle size of about 1 millimeter.

* * * * *

UNITED STATES PATENT OFFICE
CERTIFICATE OF CORRECTION

PATENT NO. : 3,862,347
DATED : January 21, 1975
INVENTOR(S) : Henricus A. Thijssen It is certified that error appears in the above-identified patent and that said Letters Patent are hereby corrected as shown below:

In column 2 - line 42 - change "permissible" to -- solid --

In column 10 - line 27 - change "the" to -- The --

In column 10 - line 36 - change "heating" to -- heated --

Signed and sealed this 1st day of July 1975.

(SEAL)
Attest:

RUTH C. MASON
Attesting Officer

C. MARSHALL DANN
Commissioner of Patents
and Trademarks